United States Patent [19]
Marinus

[11] Patent Number: 4,926,304
[45] Date of Patent: May 15, 1990

[54] SWITCHED-MODE POWER SUPPLY WITH LOW LOSS INTERRUPTED OSCILLATION

[75] Inventor: Antonius A. M. Marinus, Eindhoven, Netherlands

[73] Assignee: U.S. Philips Corporation, New York, N.Y.

[21] Appl. No.: 347,554

[22] Filed: May 4, 1989

[30] Foreign Application Priority Data

Jun. 30, 1988 [NL] Netherlands ............... 8801658
Nov. 29, 1988 [TW] Taiwan ....................... 77108337

[51] Int. Cl.$^5$ .................................... H02M 3/335
[52] U.S. Cl. .................................. 363/20; 323/323
[58] Field of Search ............. 323/223; 363/16, 18, 363/19, 20, 21

[56] References Cited

U.S. PATENT DOCUMENTS

| | | | |
|---|---|---|---|
| Re. 32,155 | 5/1986 | Nilssen | 363/18 |
| 3,641,422 | 2/1972 | Farnsworth et al. | 323/224 |
| 4,441,146 | 4/1984 | Vinciarelli | 363/30 |
| 4,451,876 | 5/1984 | Ogata | 363/21 |
| 4,466,051 | 8/1984 | Fitzgerald | 363/21 |
| 4,524,411 | 6/1985 | Willis | 363/21 |
| 4,595,977 | 6/1986 | von der Ohe | 363/21 |
| 4,607,319 | 8/1986 | Assow et al. | 363/20 |
| 4,694,385 | 9/1987 | Marinus | 363/19 |

FOREIGN PATENT DOCUMENTS 0217427 4/1987 European Pat. Off. .
3543299 6/1987 Fed. Rep. of Germany .
2502418 3/1982 France .

Primary Examiner—Patrick R. Salce
Assistant Examiner—Jeff Sterrett
Attorney, Agent, or Firm—Bernard Franzblau

[57] ABSTRACT

A switched-mode power supply circuit for converting a DC input voltage into a DC output voltage comprises a series arrangement of a controllable power switch and an inductive element coupled between the input voltage terminals. Control means are provided for rendering the power switch alternately conducting and non-conducting and a rectifier is coupled to the inductive element for making the output voltage available. The inductive element and a capacitor coupled thereto form a part of a resonant circuit in which a voltage oscillation is present in the time periods when the switch and the rectifier are currentless. The circuit further comprises means for interrupting the oscillation present in the resonant circuit at an instant when the voltage across the inductive element or the current through the capacitor is substantially zero. In one embodiment, the dissipation in the circuit is reduced and the circuit is synchronized.

17 Claims, 3 Drawing Sheets

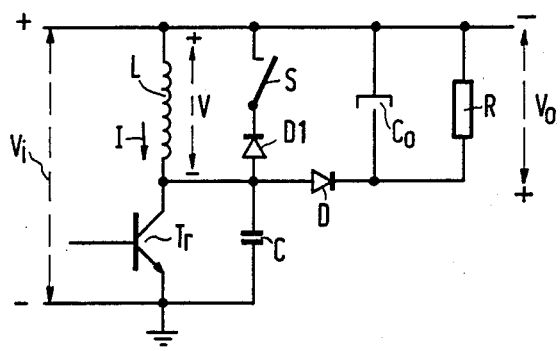
FIG.1
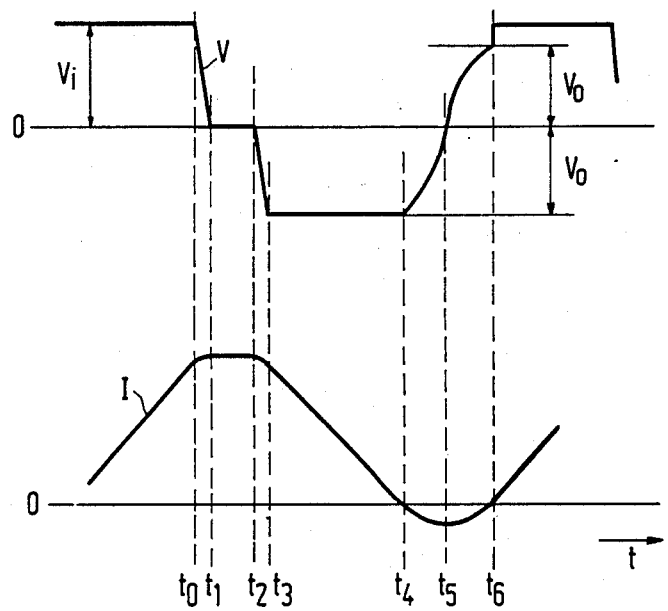
FIG.2a
FIG.2b
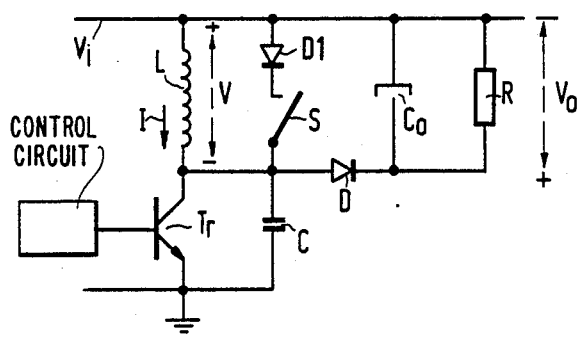
FIG.3

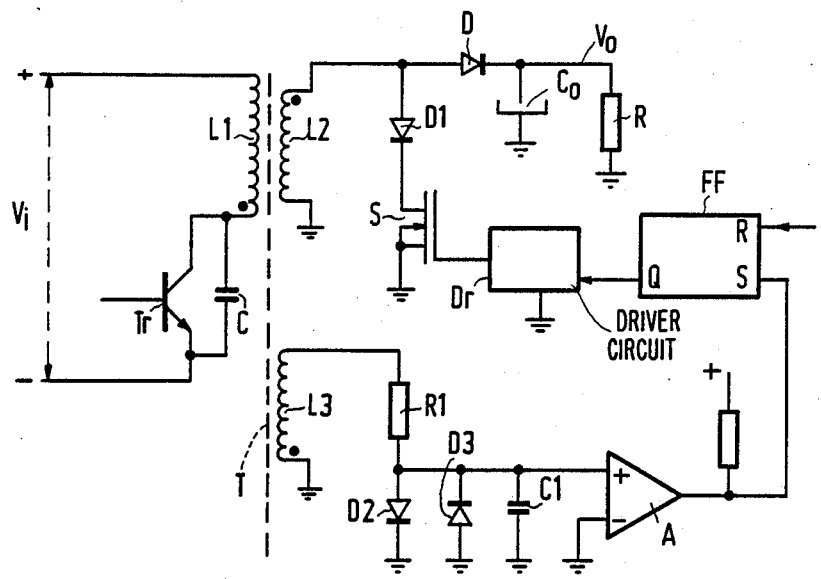
FIG. 6
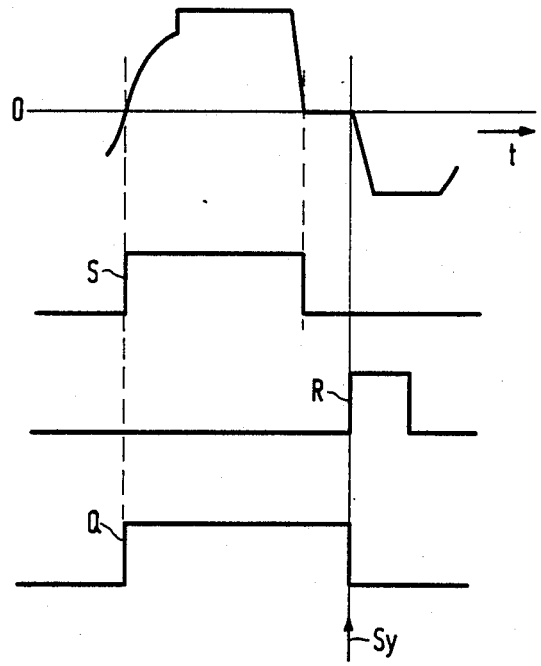
FIG. 7a
FIG. 7b
FIG. 7c
FIG. 7d

4,926,304

SWITCHED-MODE POWER SUPPLY WITH LOW LOSS INTERRUPTED OSCILLATION

BACKGROUND OF THE INVENTION

This invention relates to a switched-mode power supply circuit for converting a DC input voltage into a DC output voltage, comprising a series arrangement of a controllable power switch and an inductive element coupled between the input voltage terminals, control means for rendering the power switch alternately conducting and non-conducting, and a rectifier coupled to the inductive element for making the output voltage available, the inductive element and a capacitor coupled thereto forming a part of a resonant circuit in the periods of time when the switch and the rectifier are currentless, in which resonant circuit a voltage oscillation is then present.

Such switched-mode power supply circuits including a resonant circuit are known. Examples are described in a Netherlands patent application No. 8502339, which corresponds to U.S. Pat. No. 4,694,385 (9/15/87). The output voltage can be maintained substantially constant in spite of possible variations of the input voltage and/or of a load connected to the output voltage, for example, because the frequency of the control signals applied to the controllable switch is controlled as a function of this output voltage. The control signals may originate from an oscillator, or, in a different manner, the circuit may be self-oscillating.

SUMMARY OF THE INVENTION

According to the invention a power supply circuit of the type described above is characterized in that it comprises means for interrupting the oscillation present in the resonant circuit at an instant when the voltage across the inductive element or the current through the capacitor is substantially zero.

Due to this measure the oscillation is interrupted at a high signal level, namely at an instant when either the current through the inductance, or the voltage across the capacitor and hence the energy stored in the relevant element has an extreme value. During the interruption these quantities approximately maintain their extreme value, whereafter the oscillation is resumed from this value. As will be apparent from the further description, such an interruption has a number of advantages. For example, free oscillations, which would otherwise occur, can be eliminated so that the energy dissipated by the circuit is reduced. The means for interrupting the oscillation may be synchronizing means, the successive final instants of the interruption being periodically located with respect to time. In this way the circuit always operates at the same frequency, which may be desirable. In one embodiment the circuit can thus be synchronized by means of these means, while free oscillations do not occur and the energy which is dissipated by turning on the power switch can be reduced in the manner as described in the said U.S. Patent. In another embodiment, the circuit being a DC flyback converter which operates in a discontinuous mode, thus in which the current through the inductance becomes zero during the occurrence of the oscillation the turn-on losses are reduced due to the interruption according to the invention, while the circuit is synchronized in another, known manner.

If the invention is used in a picture display device, the circuit may be advantageously characterized in that the said instants succeed one another at the same frequency as a line deflection signal which is active in the picture display device, or at a multiple of this frequency. As a result, a disturbance which is caused by switching the various switching elements of the circuit is stationary with respect to the line deflection. If the disturbance is visible on a display screen, it is not very troublesome.

The circuit according to the invention is advantageously characterized in that the means for interrupting the oscillation constitute a clamping circuit for maintaining the voltage across the inductive element substantially zero at and after an instant when this voltage has become substantially zero. This measure ensures that the voltage across the capacitor does not substantially vary during the interruption. Preferably, the clamping circuit comprises a unidirectional current-conducting element which is arranged in series with a second switch, the series arrangement formed being arranged in parallel to the inductive element. This ensures that the interruption commences at the correct instant, which is safe for the capacitor because there occurs no voltage step.

In another embodiment the circuit is characterized in that the means for interrupting the oscillation comprise a second controllable switch arranged in series with the capacitor for interrupting the current path of the capacitor at an instant when the current therethrough is substantially zero. However, such an embodiment can only be realized in practice if the capacitance across the inductive element is small with respect to that of the capacitor of the resonant circuit.

BRIEF DESCRIPTION OF THE DRAWINGS

The invention will now be described in greater detail, by way of example, with reference to the accompanying drawings in which FIG. 1 shows the circuit diagram of a first embodiment of the circuit according to the invention, FIG. 2 shows waveforms occurring therein, FIG. 3 shows the circuit diagram of a second embodiment of the circuit according to the invention, FIG. 6 shows a more detailed circuit diagram of an embodiment of the circuit according to the principle of FIG. 1, FIG. 7 shows waveforms occurring in the circuit of FIG. 6

DESCRIPTION OF THE PREFERRED EMBODIMENTS

Figure 4A:
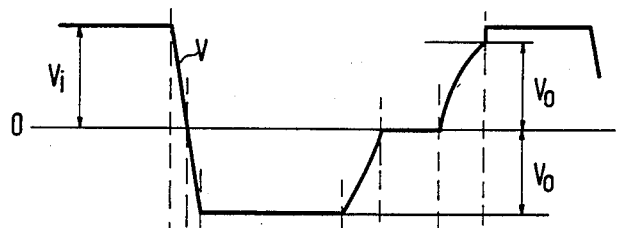
FIG. 4 shows waveforms occurring in this second embodiment.

The power supply circuit of FIG. 1 comprises a controllable power switch in the form of an NPN power switching transistor Tr whose collector is connected to an inductance L and whose emitter is connected to ground. The other end of element L is connected to the positive rail of a DC input voltage source $V_i$ whose negative rail is also connected to ground and which is, for example, a mains rectifier. The anode of a rectifier D, the anode of a diode D1 and a capacitor C are also connected to the collector of transistor Tr. A second controllable switch S is arranged between the cathode of diode D1 and the said positive rail and a smoothing capacitor $C_o$ and a load represented by a resistor R are arranged between the cathode of rectifier D and the same positive rail. The terminal of capacitor C which is not connected to the collector is connected to ground. The base lead of transistor Tr incorporates known control means (not shown) for turning the transistor alternately on and off. The control means of switch S are not shown either. In operation, a DC voltage $V_o$ is present across the parallel arrangement of elements $C_o$ and R, which voltage is the output voltage of the circuit of FIG. 1, and the voltage $V_i+V_o$ is present at the junction point of elements D, $C_o$ and R.

FIG. 2a shows the variation of the voltage V across inductance L and FIG. 2b shows the variation of the current I through L. Transistor Tr is turned on before an instant $t_o$. The voltage at the collector is substantially zero so that voltage V is substantially equal to $V_i$, while the current I increases linearly so that energy is stored in inductance L. The transistor is turned off at instant $t_o$ so that the voltage at the collector increases in accordance with a sine wave function of time, while the voltage V decreases in accordance with the same function and the current I varies in accordance with a cosine function of time. These functions are determined by the tuning frequency of the resonant circuit constituted by inductance L and capacitor C. At an instant $t_1$ voltage V reaches the value of zero and current I is maximal. Until instant $t_1$ the state of switch S, i.e. conducting or non-conducting, is irrelevant because the voltage at the anode of diode D1 is lower than $V_i$. Therefore, if switch S is conducting at instant $t_1$ or at an instant before $t_1$, current I does not start flowing through diode D1 and switch S until after this instant. Diode D1 and switch S constitute a clamping circuit by which the voltage at the collector of transistor Tr is clamped substantially at the value $V_i$, while the voltage V becomes substantially zero because the voltage drop across elements D1 and S is very low, and the current I remains substantially at the value which it had at the time of $t_1$. As a result, the oscillation is interrupted. This state is maintained as long as switch S remains conducting.

At an instant $t_2$ switch S is blocked and the oscillation is resumed. Current I again flows to capacitor C. The voltage thereacross increases above the value $V_i$ so that voltage V becomes negative in accordance with the sine function, the current I decreases in accordance with the cosine function. The voltage across capacitor C continues to increase until the value $V_i+V_o$ is reached at an instant $t_3$, which causes rectifier D to conduct. Voltage V then remains equal to $-V_o$, while the current I decreases linearly and flows to capacitor $C_o$ for recharging it, more specifically until the value of zero is reached at an instant $t_4$. Element L then no longer has any energy. After instant $t_4$ rectifier D conveys no current so that inductance L and capacitor C again constitute a resonant circuit. The capacitor is now discharged in the inductance in accordance with the same cosine function as before and current I has the negative polarity. Voltage V increases from the value $-V_o$ in accordance with the same sine function as before. At an instant $t_5$ voltage V passes the value of zero and at an instant $t_6$ current I becomes zero whilst voltage V reaches the value $V_o$ and the voltage at the collector of transistor Tr assumes the value $V_i-V_o$. This is the lowest possible value of this voltage. At instant $t_6$ transistor Tr is turned on, for example, in the manner as described in U.S. Pat. No. 4,694,385. The text of this patent is incorporated herein by reference. The collector current of the transistor flows through inductance L and this current increases in accordance with a linear function of time. This is the same situation as before instant $t_o$.

It is apparent from the foregoing that the duration of the time interval between $t_1$ and $t_2$ in which the oscillation is interrupted is determined by the location of the instant $t_2$ at which switch S is blocked. This instant is a synchronizing instant and it corresponds to the trailing edge of a pulse applied to switch S. The leading edge of this pulse may occur at any instant which is located at or after the instant at which the voltage at the collector of transistor Tr comes below the value $V_i$, i.e. the instant being one period earlier than instant $t_5$ in FIG. 2, and before or at instant $t_1$. In the absence of a periodically occurring synchronizing pulse the interval between $t_1$ and $t_2$ is reduced to zero and the circuit has a natural frequency which is determined, for example, by an oscillator which is incorporated in the control means of transistor Tr. In another manner, the circuit of FIG. 1 may form part of a self-oscillating supply circuit which is free running in the absence of a synchronizing pulse. It appears that in the case of synchronization the instants located in FIG. 2 after instant $t_1$ are delayed so that the oscillation period is longer and consequently the frequency is lower than would be the case in the event of free oscillation.

Figure 4B:
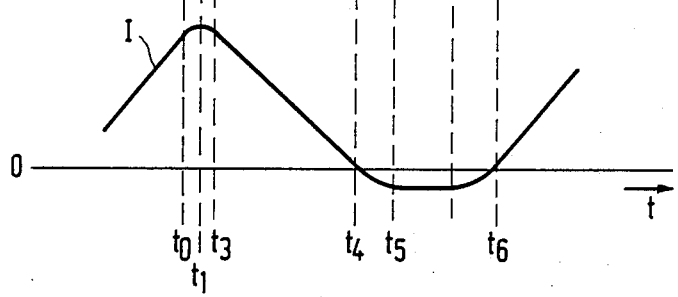

In the embodiment of FIG. 3 in which the same elements as those in FIG. 1 are denoted by the same symbols, the conductivity direction of diode D1 is reversed with respect to that in FIG. 1. In this case the conductance of switch S is of influence for interrupting the oscillation which is present during the turn-off time of transistor Tr when the voltage at the collector of transistor Tr becomes lower than $V_i$, i.e. at instant $t_5$. The leading edge of the synchronizing pulse may thus occur at any instant which is located at or after instant $t_1$ and before or at instant $t_5$, while the trailing edge occurs at the synchronizing instant. FIGS. 4a and 4b show for the embodiment of FIG. 3 variations similar to those shown in FIGS. 2a and 2b.

Both embodiments have advantages and drawbacks. It is apparent from FIGS. 2b and 4b that as compared with the embodiment of FIG. 3, the embodiment of FIG. 1 has the drawback that the current flowing during the interruption has a larger intensity resulting in the dissipation losses caused by this current in inductance L, switch S and diode D1 being higher. On the other hand the first embodiment is safer. If switch S becomes defective and remains permanently open, the circuit is not synchronizable in either case so that a higher frequency is caused without further consequences occurring, but if the switch constitutes a permanent short circuit, no detrimental effect will occur in the first-mentioned case. No replenishing energy is supplied to capacitor $C_o$ so that the energy stored therein will soon disappear. In the second case transistor Tr is permanently turned on, which may be very harmful for the transistor. In the embodiment of FIG. 1 a safety provision (not shown) may be added ensuring that switch S will conduct as long as, for example, a too high output voltage occurs. For this purpose the circuit comprises known means for comparing the relevant quantity with a predetermined limit value and for controlling switch S when this value is exceeded.

In the embodiments described the interruption of the oscillation by means of the clamping circuit with elements D1 and S is used for synchronizing the power supply circuit at high signal level. It will be noted that in the embodiment of FIG. 3 the interruption can be utilized for another purpose. In a circuit according to FIG. 3 the oscillation would subsist in the absence of elements D1 and S after the instant at which rectifier D becomes currentless, i.e. the instant corresponding to $t_4$ in FIG. 4, more specifically in accordance with ever the same sinusoidal variation and with a decreasing amplitude. The oscillation would then end at the instant when transistor Tr is turned on by means of a control signal, for example, by the control means described in the above-mentioned Patent, which means can be utilized for synchronizing the circuit. However, this will generally not take place at a moment when the voltage at the collector of transistor Tr has a minimum value and which corresponds to, for example $t_6$ in FIG. 4 so that high turn-on losses are caused. To reduce these losses, the clamping circuit with elements D1 and S can be used for interrupting the oscillation at the instant when the voltage at the collector has a minimum value, which voltage is maintained at the then assumed value $V_{i-Vo}$, while the current I remains zero, more specifically until the instant when transistor Tr is turned on by the control means.

Figure 5A:
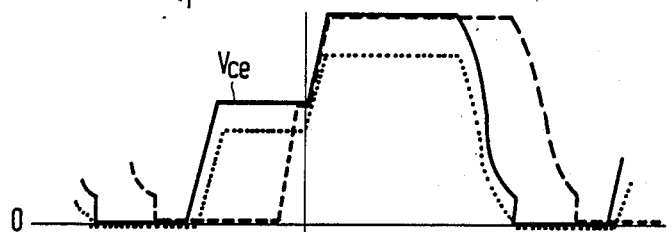
FIG. 5 shows waveforms occurring in the first embodiment of the circuit in the case of variations of the input voltage and/or the load.
Figure 5B:
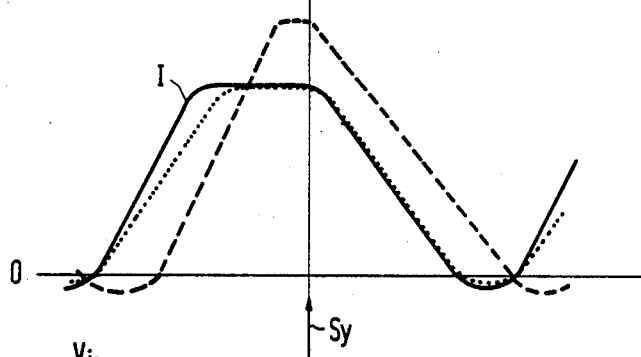

FIG. 5a shows the variation of the collector-emitter voltage $V_{ce}$ of transistor Tr for the embodiment of FIG. 1, and FIG. 5b shows the variation of the magnetizing current I for the same embodiment. The solid lines apply to the nominal case, i.e. the case where both the input voltage $V_i$ and the load R have the values calculated during the design. The broken lines apply to a larger load, i.e. a lower value of resistor R at nominal input voltage and the dotted lines apply to a nominal load at a decreased input voltage. It appears from the plotted curves that a larger load causes a longer conductivity time for rectifier D and also for transistor Tr and a larger amplitude for current I and that in the case of a lower input voltage transistor Tr is conducting for a longer period, while the current I has the same amplitude as in the nominal case. In FIGS. 5a and b the reference Sy indicates the synchronizing instant.

FIG. 6 shows the relevant part of a practical embodiment of a power supply circuit in accordance with the principle of FIG. 1. In FIG. 6 inductance L is replaced by a transformer T, a primary winding L1 of which is arranged in series with transistor Tr. The series circuit thus formed is arranged between the rails of the voltage $V_i$ and capacitor C is arranged parallel to the collector-emitter path of transistor Tr. A secondary winding L2 of transformer T is connected to ground at one end and is connected at the other end to the same elements D1 and D as in FIG. 1. The winding sense of windings L1 and L2, denoted, as usual, by means of dots, as well as the conductivity direction of rectifier D are such that a current flows through the one winding while the other winding does not convey a current ("flyback" effect). Switch S is formed with a field effect transistor whose gate is connected to an output of a driver circuit Dr, whose drain is connected to the cathode of diode D1 and whose source is connected to ground. The input of circuit Dr is connected to an output Q of a flipflop FF. A second secondary winding L3 of transformer T has the opposite winding sense with respect to winding L2. Winding L3 is connected to ground at one end and at the other end to a doublesided limiter constituted by a resistor R1 and two diodes D2 and D3. Free oscillations caused by the spread of transformer T are somewhat integrated by means of a capacitor C1 and the signal obtained is amplified by means of an amplifier A whose output is connected to the set input S of flipflop FF. The synchronizing signal for controlling switch S is applied to the reset input R of flipflop FF. Capacitor $C_o$ and load R are connected between the cathode of rectifier D and ground which is DC isolated from the input voltage $V_i$ by means of transformer T.

The circuit of FIG. 6 is used, for example, in a picture display device, for example, a television receiver, for supplying a number of circuits which are connected to the direct voltage $V_o$ which is present across capacitor $C_o$. Other, secondary windings not shown in FIG. 6, may be provided on the core of transformer T for generating other supply voltages. One of these voltages is the EHT for the final anode of a picture display tube. A ripple voltage which is caused by switching of the switching elements of the circuit of FIG. 6 is present on these voltages, and particularly on the EHT. The disturbance caused thereby will be stationary and will therefore not be very troublesome in the event that the disturbance is visible on the display screen of the display tube if the synchronizing signal applied to flipflop FF is derived from a line deflection signal which is active in the picture display device and if it has the same frequency as this signal or a multiple of this frequency. This measure obviates the use of a filter for reducing the switching ripple on the EHT lead. Voltage $V_o$ and the possible other output voltages of the circuit of FIG. 6 can be stabilized in known manner against variations of the input voltage and/or the various loads, for example, by controlling the conductivify time of transistor Tr as a function of the voltage $V_o$.

Some voltage variations in the circuit of FIG. 6 are shown: these are the variations of the voltage across winding L1 (FIG. 7a), at the input S of flipflop FF (FIG. 7b), at the input R of the flipflop (FIG. 7c) and at the output Q of the flipflop (FIG. 7d). It is apparent therefrom that the flipflop is set at the instant during the turn-off time of transistor Tr when the voltage of FIG. 7a passes the value of zero, which would result in the transistor S being turned on in the absence of diode D1. This situation is maintained until the zero crossing of the voltage across winding L2 during the subsequent conductivity time of transistor Tr, whereafter a current flows through diode D1 and transistor S, which interrupts the oscillation across the resonant circuit constituted by the various inductances and capacitances. The voltage pulse of FIG. 7b terminates at the instant of commencement of the interruption, but this has no influence on the voltage of FIG. 7d so that transistor S remains turned on. At the instant Sy when the leading edge of the synchronizing pulse occurs, flipflop FF is reset so that the voltage of FIG. 7d becomes low, which results in transistor S being turned off and the oscillation being resumed.

Modifications of the circuits shown in FIGS. 1 and 3 can be conceived. For example, capacitor C may be arranged parallel to inductance L in FIGS. 1 and 3, or to winding L1 or L2 in FIG. 6. Also the terminal of capacitor $C_o$ which is not connected to rectifier D may be connected to the negative rail instead of to the positive rail of voltage $V_i$. In this case the circuit operates as an "up-converter", in which the output voltage $V_o$, dependent on the conductivity time of transistor Tr with respect to the period, is equal to or higher than the input voltage $V_i$, in contrast to the flyback converter of FIGS. 1, 3 and 6 in which voltage $V_o$ is equal to or lower than voltage $V_i$.

Figure 8:
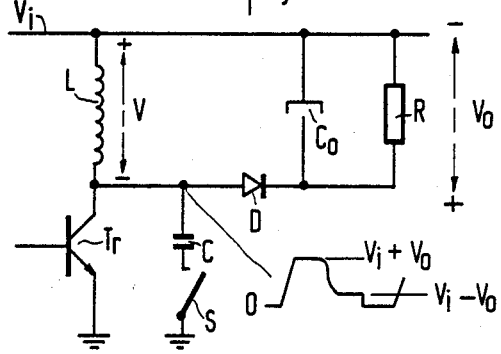
FIG. 8 shows the circuit diagram of a third embodiment of the circuit according to the invention.

Another modification is shown in FIG. 8. Compared with FIG. 1, switch S is not arranged parallel to inductance L but in series with capacitor C. Such a modification can only be realized in practice if the capacitance across inductance L is small with respect to that of capacitor C. The oscillation during the turn-off time of transistor Tr is interrupted because switch S is rendered non-conducting by suitable control means, more specifically at an instant when the current flowing through inductance L and capacitor C is zero, but preferably not at the instant when the voltage at the collector of transistor Tr has the maximum value but at a later instant when this voltage has its minimum value. After this instant the current remains zero, while the said voltage remains at the value $V_i-V_o$ assumed at this instant and while the voltage $V$ across inductance L remains at the value $V_o$. This situation is maintained until transistor Tr is turned on again. FIG. 8 shows the variation of the voltage at the collector. It may be noted that in the modification of FIG. 8 the energy which is dissipated by turning on the transistor is minimum and the free oscillations, which would otherwise occur after instant $t_6$, are eliminated. As was the case with the circuit of FIG. 3, the interruption of the oscillation may be used in the case of the embodiment of FIG. 8 for minimizing the dissipated energy instead of for synchronizing purposes.

What is claimed is:

1. A switched-mode power supply circuit for converting a DC input voltage into a DC output voltage, comprising: a series arrangement of a controllable power switch and an inductive element coupled between input voltage terminals, control means for rendering the power switch alternately conducting and non-conducting, and a rectifier coupled to the inductive element for making the output voltage available, the inductive element and a capacitor coupled thereto forming a part of a resonant circuit in which a voltage oscillation is present in periods of time when the power switch and the rectifier are currentless, and means for interrupting the oscillation present in the resonant circuit at an instant when a voltage across the inductive element or a current through the capacitor is substantially zero.

2. A circuit as claimed claim 1, wherein the means for interrupting the oscillation comprise synchronizing means, successive final instants of the interruption ocurring periodically with respect to time.

3. A circuit as claimed in claim 2 for use in a picture display device, wherein said synchronizing means cause said instants to succeed one another at the same frequency as a line deflection signal which is active in the picture display device, or at a multiple of said frequency.

4. A circuit as claimed in claim 1, wherein the means for interrupting the oscillation, comprises a clamping circuit for maintaining the voltage across the inductive element substantially zero at and after said instant when said voltage has become substantially zero.

5. A circuit as claimed in claim 4, wherein the instant when the clamping circuit starts to be operative occurs shortly after a turn-off instant of the power switch.

6. A circuit as claimed in claim 5, further comprising means for comparing a quantity occurring in the circuit with a predetermined limit value and for activating the clamping circuit when said limit value is exceeded.

7. A circuit as claimed in claim 5, wherein the clamping circuit includes a unidirectional current conducting element connected in series circuit with a second controllable switch and with said series circuit connected parallel to the inductive element, and wherein a pulse applied to the second controllable switch for rendering said second switch conducting has a leading edge which occurs simultaneously with or after the instant when the voltage across the inductive element becomes zero before a turn-on instant of the power switch, but not later than a zero crossing of said voltage after a subsequent turn-off instant of the power switch, and a trailing edge which does not occur earlier than said zero crossing.

8. A circuit as claimed in claim 4, characterized in that the clamping circuit comprises a unidirectional current conducting element connected in series circuit with a second controllable switch, the series circuit being connected parallel to the inductive element.

9. A circuit as claimed in claim 8, wherein a control pulse applied to the second controllable switch for rendering said second switch conducting has a leading edge which occurs simultaneously with or after the instant when the voltage across the inductive element becomes zero before a turn-on instant of the power switch, but not later than a zero crossing of said voltage after a subsequent turn-off instant of the power switch, and a trailing edge which does not occur earlier than said zero crossing.

10. A circuit as claimed in claim 9, further comprising a bistable element for applying the control pulse to the second controllable switch, the edge of a set pulse applied to the bistable element each time occurring during a zero crossing of the voltage across the inductive element and the leading edge of a reset pulse also applied to the bistable element occurring at the final instant of the interruption.

11. A circuit as claimed in claim 8, wherein a pulse applied to the second controllable switch for rendering said second switch conducting has a leading edge which occurs simultaneously with or after the instant when the voltage across the inductive element becomes zero after a turn-off instant of the power switch, but not later than a zero crossing of said voltage before a subsequent turn-on instant of the power switch, and a trailing edge which does not occur earlier than said zero crossing.

12. A circuit as claimed in claim 8, wherein said unidirectional current conducting element comprises a diode.

13. A circuit as claimed in claim 4, wherein the instant at which the clamping circuit starts to be operative occurs shortly before a turn-on instant of the power switch.

14. A circuit as claimed in claim 13, wherein the clamping circuit includes a unidirectional current conducting element connected in series circuit with a second controllable switch and with said series circuit connected parallel to the inductive element, and wherein a pulse applied to the second controllable switch for rendering said second switch conducting has a leading edge which occurs simultaneously with or after the instant when the voltage across the inductive element becomes zero after a turn-off instant of the power switch, but not later than a zero crossing of said voltage before a subsequent turn-on instant of the power switch, and a trailing edge which does not occur. earlier than said zero crossing.

15. A circuit as claimed in claim 1, wherein the means for interrupting the oscillation comprise a second controllable switch connected in series with the capacitor for interrupting the current path of the capacitor at an instant when the current therethrough is substantially zero.

16. A circuit as claimed in claim 15, wherein the second controllable switch is blocked at an instant when the voltage across the power switch substantially has a minimum value.

17. A circuit as claimed in claim 1, further comprising control means for the power switch which drives said power switch into the conducting state at an instant when a voltage thereacross substantially has a minimum value.

* * * * *